United States Patent [19]

Held

[11] 4,435,104

[45] Mar. 6, 1984

[54] RING WEDGE JOINT FOR SOLID OR LAMINATED WOOD SECTIONS

[76] Inventor: Kurt Held, Alte Str. 1, D-7218 Trossingen 2, Fed. Rep. of Germany

[21] Appl. No.: 409,190

[22] Filed: Aug. 18, 1982

[30] Foreign Application Priority Data

Sep. 4, 1981 [DE] Fed. Rep. of Germany ....... 3135030

[51] Int. Cl.³ ............................................ F16B 12/00
[52] U.S. Cl. .................................. 403/332; 403/364; 285/328
[58] Field of Search ............... 403/332, 364, 339, 334, 403/381, 382; 285/328

[56] References Cited

U.S. PATENT DOCUMENTS

| 115,583 | 6/1871 | Dann et al. ...................... 403/364 X |
| 371,598 | 10/1887 | Landis ............................. 285/328 X |
| 602,123 | 4/1898 | Brandon et al. ..................... 403/364 |
| 3,262,723 | 7/1966 | Strickler .......................... 403/364 X |

*Primary Examiner*—Andrew V. Kundrat
*Attorney, Agent, or Firm*—Toren, McGeady and Stanger

[57] ABSTRACT

A ring wedge joint for interconnecting solid or laminated wood sections, such as bar-shaped or rod-shaped sections used as chair parts, tool handles, window frame sections and the like is formed by alternating ring wedges and ring wedge grooves on the end surfaces of the sections to be connected. The ring wedges and the ring wedge grooves on the end surfaces are offset relative to one another so that the ring wedges on one section fit into the ring wedge grooves on the other. Preferably, the opposite sides of the ring wedges converge toward the end surface of the wood sections while the opposite surfaces of the ring wedge grooves diverge toward the end surfaces.

7 Claims, 3 Drawing Figures

RING WEDGE JOINT FOR SOLID OR LAMINATED WOOD SECTIONS

SUMMARY OF THE INVENTION

The present invention is directed to a ring wedge joint for interconnecting solid or laminated wood sections, such as rod-shaped or bar-shaped sections used as chair parts, tool handles, window frame sections and the like. The ring wedge joint is formed by alternating concentric ring wedges and ring wedge grooves on the end surfaces of the wood sections forming the joint.

It has been known to make lengthwise connections in wood by so-called dovetail joints. A disadvantage of this type of joint is the visibility of the dovetail configuration on the opposite sides of the jointed members. So-called minimortise joints, used especially at window frame corner joints, are dovetail joints modified for the intended purpose. The disadvantage of such joints is known to people skilled in the art in that dimensional changes due to moisture variations in the wood affect the usually right-angle joint.

It is the primary object of the present invention to provide a joint free of the disadvantages experienced in the past and affords the formation of a joint without any or with only short clamping times while affording maximum joint strength.

In accordance with the present invention, a ring wedge joint is provided by alternating concentric ring wedges and ring wedge grooves in the ends of the wood sections to be interconnected. The lengthwise connection of the rod-shaped or bar-shaped wood section formed of regular wood or laminated layers of wood is effected with the use of wood adhesive.

In such joints, beyond bonding strengths similar to the tensile strengths of the base material, short setting or clamping times, low wood consumption and a pleasing appearance of the joint are required. Moreover, glued connections of the conventional type require pressure on the seam while the glue sets combined with the least possible seam thickness.

In accordance with the present invention, the wedge form is determined by the shape of the ends of the bars or sections to be connected. Ring wedges and ring wedge grooves are provided in each of the ends forming the joint with the ring wedges offset relative to one another, that is, with the ring wedges on one end aligned with the ring wedge grooves on the other, so that the two ends fit exactly one in the other under tension.

If the flank angle of the ring wedges is arranged in a self-locking manner, that is, if it is smaller than the friction angle of the wood being joined under the lubricating effect of the glue, then the joint can be formed by briefly pressing the ends of the wood sections together, placing the ring wedges into the corresponding grooves. The hardening or setting of the glue occurs under wedge tension between the ring wedge faces without external clamping forces.

A joint formed according to the present invention is especially useful in window frame corner joints where the frame sections are laminated from regular wood sections. To take into account the natural volume change of the regular wood section due to moisture fluctuation, a corner angle is formed by laminating a corner piece from thin layers (veneers) of the same wood. Into the ends of the corner piece, located at right angles to one another, ring wedges and grooves are formed.

A particular advantage of the joints embodying the present invention is the invisibility of the wedge configuration from the outside. All that is visible is a straight joint extending transverse of the wood fiber or, depending on the cut, a curved joint along the outside. In such a joint, the assembled sections hold together immediately after they are pressed together, without waiting for the glue to set. In frame corner joints, volume changes due to moisture fluctuations cannot effect change in the joint angle, because the laminated wood corner piece is subject to the same changes during moisture fluctuations.

Under ideal conditions, the glue connection at the wedge faces, since the faces are wetted with glue and slide on one another, comes under area pressure until the wedges jam and the glue sets. Tensile and bending loads at the joint are transmitted as shearing forces and the glued joints resists these forces especially well, as has been shown from experience. If the joint includes several concentric ring wedges, a plurality of shear faces is formed, depending on the wedge length and height, whose strength effect increases without more than one wedge length per joint occurring as wood loss.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
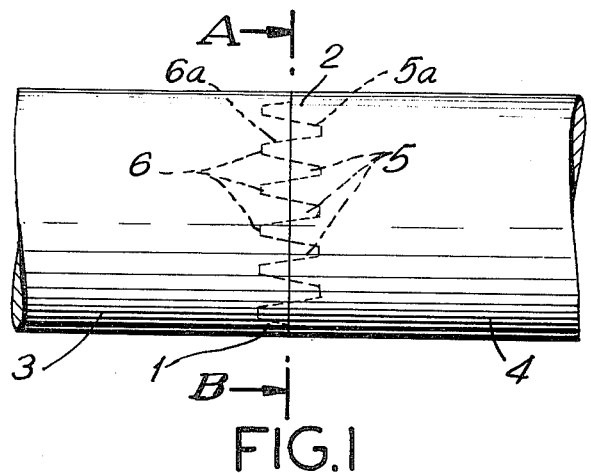
FIG. 1 is a longitudinal sectional view illustrating a ring wedge joint embodying the present invention interconnecting round bar-shaped sections.

In FIG. 1 the ends 1, 2 of two wood sections 3, 4 are joined together by concentric ring wedges 5 offset relative to one another in the ends of the sections. The concentric ring wedges 5 in the end of each section 3, 4 are spaced apart by ring wedge grooves 6. The ring wedges 5 in one end align with the ring wedge grooves in the other so that the two ends fit together forming the ring wedge joint. As viewed in FIGS. 1 and 2 the ring wedge 5' of section 3 located on the centerline c—c is, in fact, a frusto-conically shaped dowel and fits into a correspondingly frusto-conically shaped wedge groove 6' in section 4. As can be seen in FIG. 1, the opposite surfaces or flanks 5a of the ring wedges 5 converge toward the end surface of the sections. Conversely, the opposite surfaces 6a of the ring wedge grooves 6 diverge toward the end surface to ensure a snug meshing of the sections.

Figure 2:
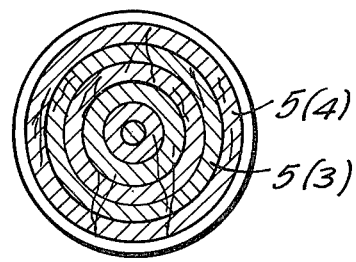
FIG. 2 is a transverse sectional view taken along the line A-B in FIG. 1.

In FIG. 2, the alternating arrangement of the ring wedges 5 fitted into the corresponding ring wedge grooves 6 can be appreciated along with the centered ring wedge or dowel 5' on section 3 fitting into the corresponding groove 6' in section 4.

Figure 3:
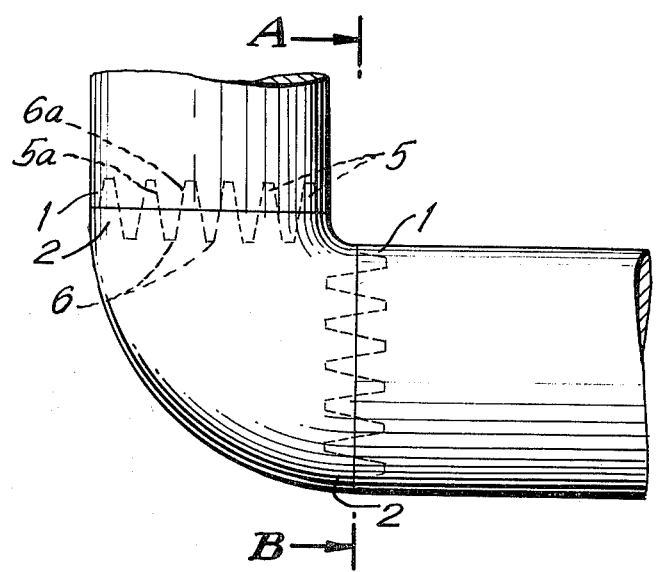
FIG. 3 is a section through a frame corner joint embodying the present invention where a laminated wood corner piece interconnects two longitudinally extending solid wood sections and illustrating the configuration of the ring wedge joint between the frame parts.

In FIG. 3 a schematic illustration is provided of a frame corner joint where the members forming the joints are indicated by the same references numerals as in FIG. 1. Two elongated sections such as the sections 3, 4 in FIG. 1 are disposed at right angles to one another and are interconnected by a corner section formed of a number of laminations or layers. The ring wedge joints are disposed at right angles to one another. Alternating concentric ring wedges 5 and ring wedge grooves 6 are formed in the elongated sections and in the laminated corner section so that a ring wedge joint is formed between each of the opposite end surfaces of the corner section and the ends of the elongated sections.

While specific embodiments of the invention have been shown and described in detail to illustrate the application of the inventive principles, it will be understood that the invention may be embodied otherwise without departing from such principles.

I claim:

1. Ring wedge joint for solid or laminated wood sections, such as rod-shaped or bar-shaped wood sections used as chair parts, tool shanks, window frame members and the like, comprising an axially extending first wood section having a first end surface extending transversely of the axis thereof, an axially extending second wood section having a second end surface extending transversely of the axis thereof, each of said first and second end surfaces being axially aligned and lying in a comma plane substantially normal to said axes and havng extending therefrom alternating, co-extensive concentric ring wedges and ring wedge grooves extending around the aligned axes of said first and second wood sections, said first wood section having a frusto-conically shaped dowel centered on the axis thereof spaced radially inwardly from the adjacent said ring wedge on said first wood section by one said concentric ring wedge groove, said second wood section having a frusto-conically shaped wedge groove corresponding to said frusto-conically shaped dowel encircled by the innermost said ring wedge on said second wood section, and said ring wedges on said first end surface and said ring wedge grooves on said second end surface and said ring wedge grooves on said first end surface and said ring wedges on said second end surface are aligned so that said ring wedges on said first and second ends interfit in surface contacting engagement with said ring wedge grooves on the other one of said first and second ends, said ring wedges and said ring wedge grooves are equidistantly spaced apart on said first and second wood sections and the axially extending surfaces of the interfitting said ring wedges and said ring wedge grooves afford a snug meshing of said first and second wood sections.

2. Ring wedge joint, as set forth in claim 1, wherein the opposite surfaces of said ring wedges extending to said first and second end surfaces converge toward the first and second end surfaces and the opposite surfaces of said ring wedge grooves diverge toward said first and second end surfaces.

3. Ring wedge joint for solid or laminated sections, comprising a first axially elongated wood section having a first end surface extending transversely of the axis thereof, a second elongated wood section having a second end surface extending transversely of the axis thereof, a third angle shaped wood section having a first end surface and a second end surface with the first and second end surfaces of said angled wood section disposed substantially at right angles to one another, each of said first and second end surfaces on said first and second wood sections and said angled wood section having alternating, co-extensive concentric ring wedges and ring wedge grooves, with said ring wedges and ring wedge grooves on said first, second and third wood sections equidistantly spaced apart and said ring wedges on said first end of said first wood section and on said second end of said second wood section are aligned, respectively, with the ring wedge grooves on the first end and the second end of said third angled wood section so that said first wood section interfits in surface contacting engagement with the first end of said angled wood section and said second wood section interfits with the second end of said angled wood section.

4. Ring wedge joint, as set forth in claim 3, wherein said first and second wood sections are solid wood sections and said angled wood section comprises a plurality of wood layers laminated together.

5. Ring wedge joint, as set forth in claim 1 or 3, wherein each of the axially extending surfaces of said ring wedges and said ring wedge grooves in interfitting surface contacting engagement has a flank angle smaller than the friction angle of said wood sections being joined so that said wood sections interfit in a self-locking manner.

6. Ring wedge joint, as set forth in claim 5, wherein a wood adhesive secures said wood sections together.

7. Ring wedge joint, as set forth in claim 1 or 3, wherein the joint between said wood sections is formed as a single continuous line on the radially outer surfaces of said wood sections.

* * * * *